United States Patent [19]

Slack et al.

[11] 4,100,581
[45] Jul. 11, 1978

[54] DOOR ACTUATED MESSAGE DEVICE

[76] Inventors: Donald J. Slack, 904 Orangewood Dr., Brea, Calif. 92621; Jay D. Talley, 6352 San Harco Cir., Buena Park, Calif. 90620

[21] Appl. No.: 728,048

[22] Filed: Sep. 30, 1976

[51] Int. Cl.² .................. G11B 15/48; H01H 3/16; G08B 13/08
[52] U.S. Cl. .................. 360/12; 179/100.1 C; 200/61.62; 340/545; 340/692
[58] Field of Search ............... 360/12, 71, 74; 179/100.1 C; 340/274 R; 200/61.7, 61.62, 61.44

[56] References Cited

U.S. PATENT DOCUMENTS

| | | | |
|---|---|---|---|
| 3,197,588 | 7/1965 | Baldwin et al. | 340/274 R |
| 3,409,745 | 11/1968 | Kock | 360/12 |
| 3,419,687 | 12/1968 | Stewart | 179/100.1 C |
| 3,825,947 | 7/1974 | Rubin et al. | 179/100.1 C |
| 3,878,539 | 4/1975 | Gooding | 340/274 A |
| 3,906,442 | 9/1975 | Mosteller | 200/61.44 |
| 3,938,120 | 2/1976 | O'Connell | 340/274 R |
| 4,023,151 | 5/1977 | Markham | 179/100.1 C |

Primary Examiner—Robert S. Tupper
Attorney, Agent, or Firm—Clarence A. O'Brien; Harvey B. Jacobson

[57] ABSTRACT

A door actuated message device includes a quick attach-detach mounting bracket for installation of a self-contained message unit adjacent a door of a business establishment or the like for actuation of an adjustable lever arm connected to a microswitch unit. The microswitch unit is mounted on a rotatable disc set into the bottom of the integral unit. This permits the position of the trigger arm of the microswitch to be adjusted relative to the door by which it is actuated. The switch will initiate a cycle of the tape containing the recorded message thereon for broadcast to desired persons coming through the door. A notch provided on the magnet record tape together with a second microswitch having a feeler arm thereon stops the action of the player mechanism after a single cycle of the tape.

8 Claims, 4 Drawing Figures

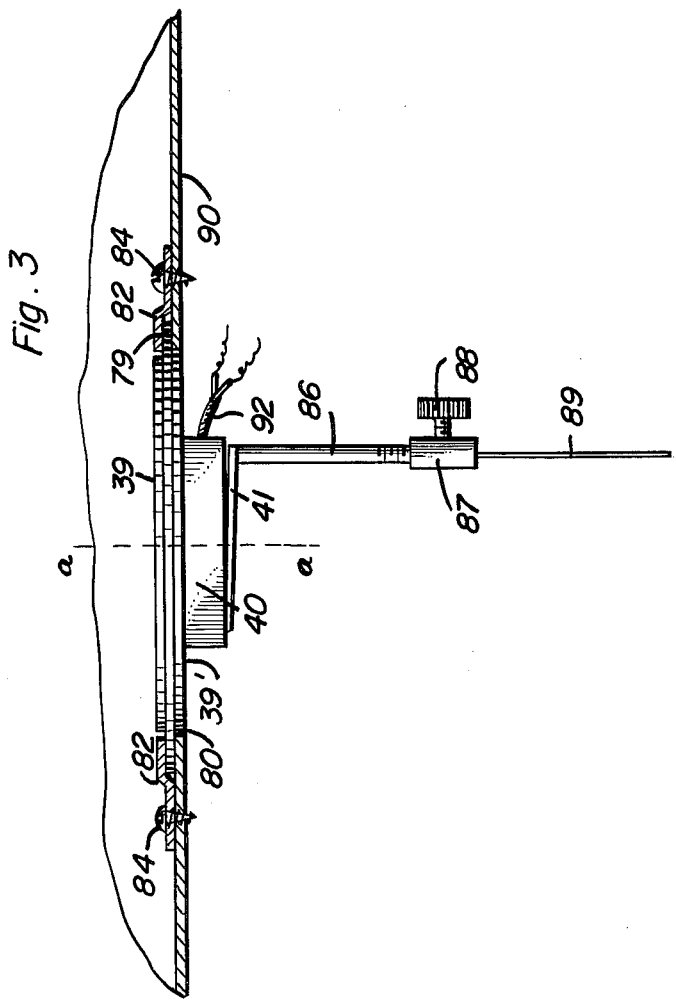
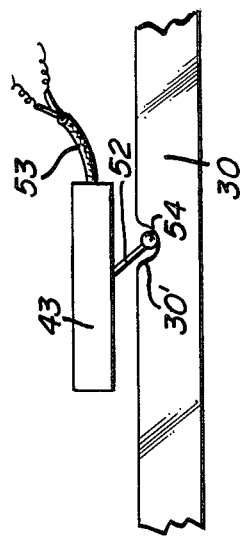
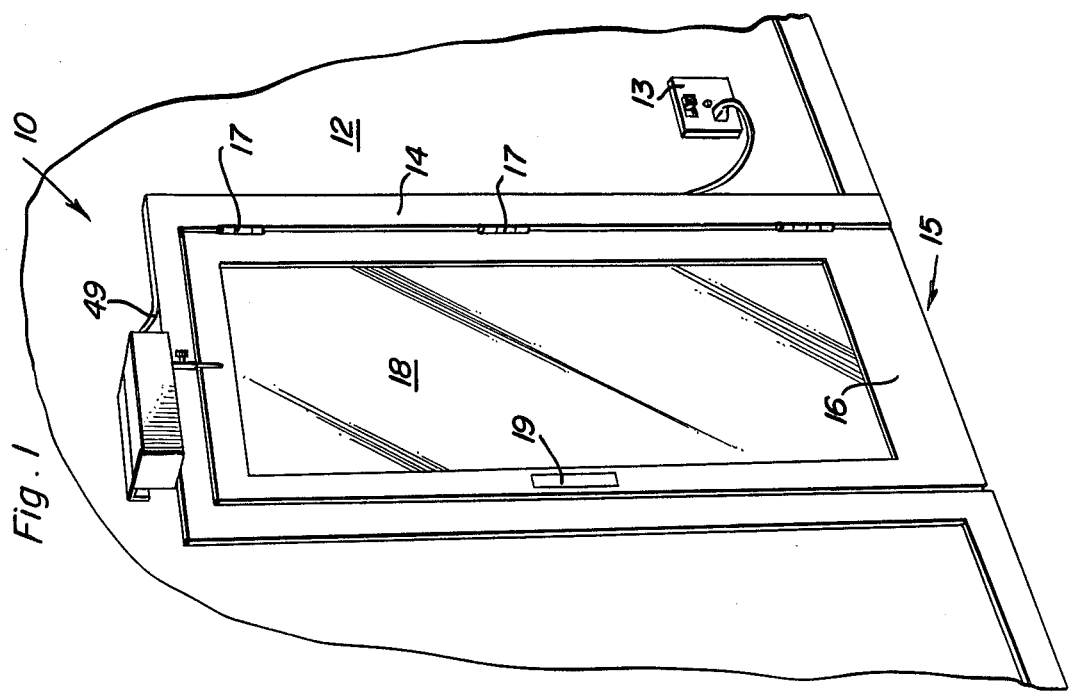

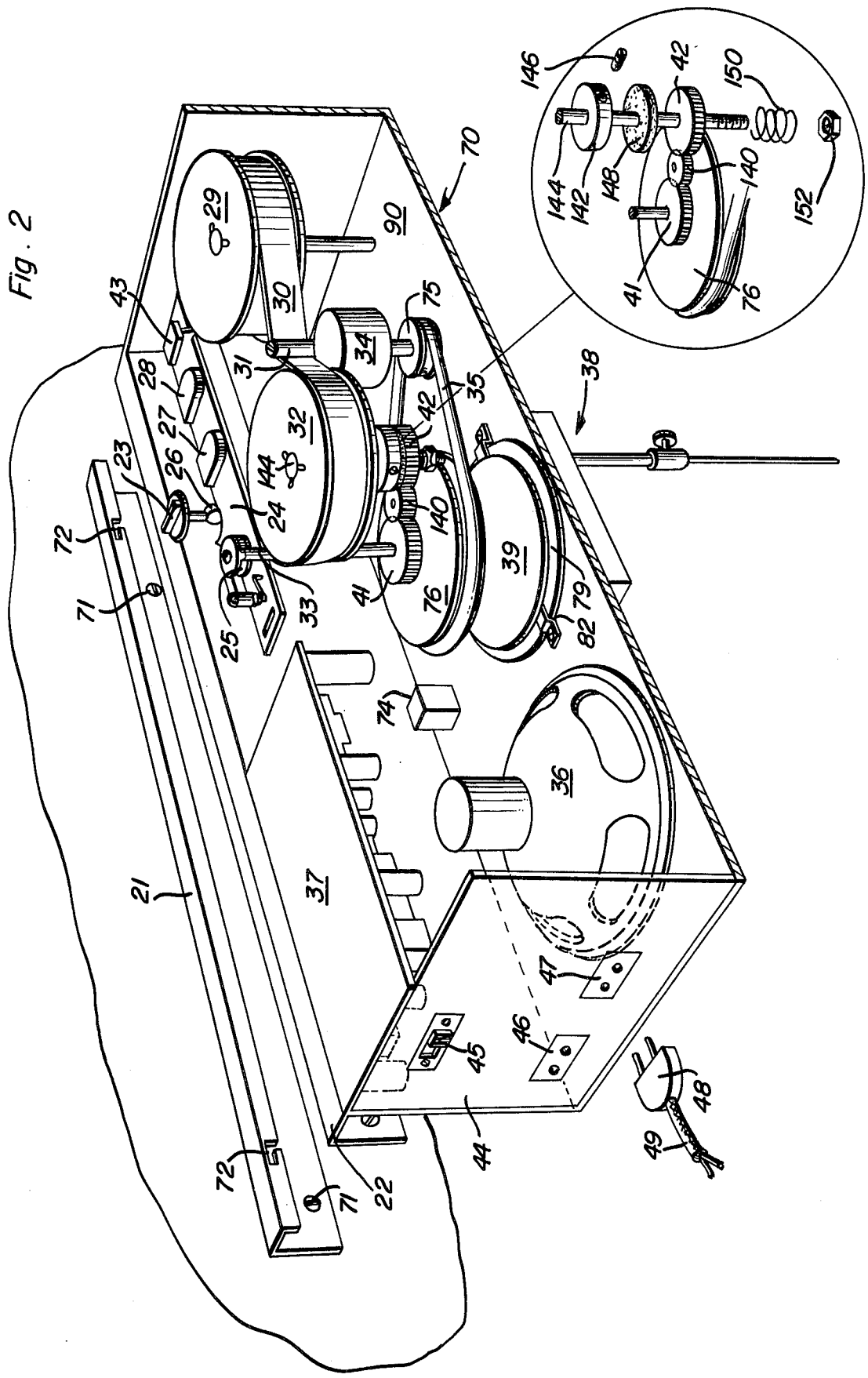

DOOR ACTUATED MESSAGE DEVICE

BACKGROUND OF THE INVENTION

1. Field of the Invention

This invention relates generally to devices for delivering pre-recorded messages to persons coming through a desired area such as through the door of a business establishment for the purpose of conveying a short pre-recorded message to same.

2. Description of the Prior Art

A problem with known type devices for conveying messages to desired persons is that normally such messages cannot be pre-recorded with accurate single cycle actuation and de-actuation of the playing mechanism.

Another problem with known type devices is that they are not readily attachable and detachable to different door attaching structures to permit the quick and easy interchange of a single player unit for different door inlets and outlets of a business establishment. Thus, in order to have flexibility and desired coverage of a multi-exit business establishment, a plurality of units are normally necessary. This greatly increases the overall cost which is sometimes prohibitive for the small business operator.

Another problem with known type devices are that they are not readily adjustable for actuation by different door swings and sizes of same.

Known prior art devices which may be pertinent to this invention are listed as follows:

| 873,638 | Van Bergh | December 10, 1907 |
| 2,152,296 | Weis et al | March 28, 1939 |
| 2,455,922 | Englander | December 14, 1948 |

None of these known devices offers the new and unique features of the invention disclosed herein.

SUMMARY OF THE INVENTION

An object of the present invention is to provide an easily and quickly attachable single component message unit for an entrance door for a business establishment and the like for conveying a desired pre-recorded message to persons entering the business establishment through said door.

Another object of this invention is to provide a single cycle message unit having automatic stop actuating mechanism for stopping the unit after the message has been played once. The overall unit then must be re-energized in order to repeat the cycle.

A still further object of this invention is to provide a message unit of quick attachment type for mounting adjacent a door which normally may be opened and closed and provided with an easily adjustable actuating switch structure for varying the point of actuation by said door.

Another further object of this invention is to provide a turn-on switch actuating structure mountable with a message unit for quick adjustment of the point at which the switch will be actuated when a door associated therewith opens and to permit the adustment to be made with a fine degree of adjustment thereof. Also, the structure is so designed that it will not be damaged in case the door is swung wide open or opened much further than normal.

A still further additional object of this invention is to provide a completely self-contained record-playback magnetic tape unit which will include all of the necessary electronic components together with a voice and audio output speaker for direct reproduction of a desired meassage to anyone close to the unit.

The door actuated message device of this invention has a number of new and important features. The message unit is basically a one cycle tape recorder structure having automatic stop switch means provided therewith for stopping the drive and tape transport after a single cycle or a single message is completed. The single unit includes all of the necessary tape transport and drive structure, the necessary record heads, playback heads, erase structure, amplifier and electronic control structure, together with an output speaker. Also, self-contained batteries may be provided and/or a power supply from conventional type house and business electric supply lines.

A quick attach-detach mounting bracket is provided with the message unit for permitting the mounting of same closely adjacent a conventional type door of a residential or business establishment. This quick attach-detach structure also permits a plurality of the base mounting brackets to be mounted on numerous doors of the same establishment, or even of different establishments, and then permits a single message unit to be removed from one mounted position to another mounted position within the same store, or between stores. This has a very desirable benefit of permitting an owner/operator of a business establishment to try different places of operation for the single unit with the same or different pre-recorded message. This can greatly reduce the cost of the strem of the owner while increasing the benefits derived therefrom.

Several additional important features are provided such as the adjustable turn-on switch structure which includes a sensitive microswitch having depending therefrom a hollow metal tube with a setscrew adjustment at the open end thereof for reception of a flexible adjustable plastic rod therewithin. This flexible adjustable rod is the member which is directly contacted by the door it is opened, and being flexible will prevent damage to the metal tube and/or the microswitch if the door is swung wide open. Also, the adjustable setscrew structure permits the length of the flexible member to be adjusted relative to the door with which it is contacted. Another important feature is the provision of a microswitch having a feeler arm structure associated therewith for contact with a pre-formed notch in one of the edges of the magnetic tape. Upon contact with the notch in the tape the microswitch is actuated to in turn control a relay for shutting off power to the unit. Thus, after one cycle of operation, or one playing of the message, the overall unit will be turned off until re-energized by actuation of the turn-on switch mechanism by the door opening again. This feature is also important because it saves energy and keeps the message unit in an off condition after each single cycle of operation. In a small business establishment where the people, hopefully customers, only come in occasionally, this can result in an important savings in energy.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE FIGURES

FIG. 1 is a perspective view of the device of this invention as mounted above a door in a business establishment;

FIG. 2 is a perspective view of the overall message device per se and the associated mounted structure therefor;

FIG. 3 is a side elevational view, partly in cross section, of the adjustable turn-on switch mechanism; and FIG. 4 is a plan view of the single cycle tape actuated switch structure.

DESCRIPTION OF THE PREFERRED EMBODIMENT

Looking at FIG. 1 of the drawings, reference numeral 10 indicates in general the door actuated message device of this invention as installed on the wall and door frame above a door of a business establishment or the like. As shown the wall 12 of the building is indicated with a door frame 14 being set thereinto. The door structure itself 15 as is conventional if provided with a frame 16 supported along one vertical edge thereof by hinges 17 and may include a glass panel 18 together with door opening latch structure 19. This general description and showing of a door structure is merely for illustration purposes, and the device may be mounted adjacent any type of swing open door structure. A conventional electrical power outlet 13 is also shown as mounted in the wall 12 for providing the necessary electrical operating power to the message unit. Self-contained batteries may also be used to power the unit.

Looking at FIG. 2 of the drawings, the integral message unit will now be described in detail. A rectangular box-like housing 70 is provided for the mounting and containing of all of the necessary component parts of the message unit. Mounted along one wall of the message unit, the back wall as shown in FIG. 2, is a bracket attaching structure 22 for quick attach-detach to a wall mounted bracket structure 21. Screws 71 may be used to attach the bracket 21 to the wall while L-slots 72 receive projecting pins, not shown, on the backside of the bracket 22 for quick attach-detach engagement with the L-slots 72. This example of a quick attach-detach bracket is exemplary only, and any type bracket structure which permits the message unit to be quickly mounted adjacent a door may be used. The overall important feature is the concept of being able to quickly mount the component message unit adjacent an open door. By having a plurality of bracket structures such as 21 at different doors in a given establishment, or at different establishments, the same message unit may be moved from one to another quickly an inexpensively.

All of the necessary component units for delivering a single cycle of a pre-recorded message are contained within the box-like housing 70. A control knob 23 is provided for operating the necessary electrical switches, not shown, together with the mechanical cam structure 26 for operation of the unit to either record a desired message onto the tape, or to put the unit into play position for actuation by the switches to be described below. A pivotally mounted plate 24 supports a tape capstan tension roller 25 thereupon and at one end thereof, while a record head 27 with necessary erase head structure associated therewith and a playback head 28 are mounted on the plate 24 towards the other end of said plate. Also mounted on this same plate is the stop microswitch 43. A freely rotatable tape spool 29 is appropriately mounted within the box structure while a tape idler roller 31 is similarly rotatably mounted therewithin. A tape drive capstan 33 and a driven tape spool 32 are also provided. An electric motor 34 connected by appropriate wiring, not shown, to the operating relay 74 and the energizing power source also is included. A drive pulley 76 connected to the motor shaft drives a flexible belt 35 for in turn driving the tape capstan 33 and rubber gear 41 integral therewith. The rubber gear 41 in turn drives another rubber gear 42 for driving the spool 32, by means of an idler wheel 140 and the tension structure shown in the enlarged portion of FIG. 4. A wheel 142 is attached to the spool drive shaft 144 by means of setscrew 146. A friction disc of felt or the like is between wheels 142 and 42, which are biased together by the spring 150 and adjusting nut 152.

Appropriate electronic amplifier circuitry 37 is also provided, preferably of the low energy utilization solid state type, and in turn drives an output speaker 36 mounted at the bottom of the container for projecting the desired message downwardly and outwardly to anyone close by. An actuating microswitch mechanism, indicated in general by reference numeral 38, is attached to the bottom of the container and is mounted for adjustable rotation by means of a disc member 39. An end wall 44 of the container is provided with appropriate controls such as an on and off switch 45, a record outlet 46, an input power socket 47 and an input power plug 48 for connection the electrical receptacle 13 is also provided. While the electrical wiring connections between the various sockets and electrical components of in FIG. 2 are not shown on the drawing, for purposes of clarity of illustration, such wiring is of course necessary and is connected in the conventional manner for such devices.

A very important feature of this invention is in the adjustable turn-on microswitch structure for the message unit. This may be seen in greater detail in FIG. 3. The disc member 39 is provided with an extending flange portion 79 which rests upon the bottom 90 of the housing 70. An aperture 80 is provided in the bottom 90 which is just slightly larger in diameter than the lower portion 39' of the disc member. The projecting flange member 79 of circular shape and of greater diameter than member 39 rotatably supports the member 39 upon the bottom 90 and within the aperture 80. A plurality of spring metal clips 82, preferably at least 3 in number, are provided and attached to the bottom 90 by screws 84. These clips 82 engage the upper surface of the flange 79 with slight frictional engagement therewith. Thus, the disc 39 may be rotated within the aperture 80. But would normally be maintained in whatever position it is adjusted to. Rotation about the center line $a$—$a$ permits an accurate adjustment of the turn-on switch structure, described as follows, relative to the door by which it is actuated. Mounted upon the bottom portion 39' of the disc member is a microswitch 40. This microswitch 40 has an actuating member 41 extending therefrom with a hollow metal tube extension 86 integrally attached thereto. At the lower opening of the hollow tube 86 is provided an enlarged tubular member 87 with an adjustable setscrew 88 through an appropriate tapped aperture therewithin. An adjustable flexible plastic rod member 89 is telescopically mounted within the setscrew structure 87, 88 and the hollow tube 86. This permits the amount of rod 89 extending from the tube 86 to be adjusted relative thereto.

Thus, when the message unit is mounted above a door such as shown in FIG. 1, the amount of contact of the rod 89 with the door when it is open may be varied and very accurately adjusted. Normally, the adjustment will be such that contact is made when the door is open wide enough for persons to normally enter the establishment. However, if the door should be flung open or opened wider than normal, the flexible rod 89 will merely bend and permit the door to pass thereunder, without damage to any of the associated components. The worst that could happen would be that the flexible rod 89 would snap off and need to be replaced before further operation of the unit. This in itself is a great safety feature against damage of the message unit which would be obviously fairly expensive. The microswitch 40 is connected by appropriate wiring 92 to the electrical actuating relay 74 of the message unit for a turn-on of the tape drive as well as the electrical components for the audio circuit. Once initiated the tape drive will start moving the tape 30 past the playback head 28 which will in turn feed the developed electrical signals through the amplifier structure 37 for broadcast of the desired message through the output speaker 36.

Looking at FIG. 4, another important feature of this invention is shown. An appropriate notch 30' is provided in the tape after the end of the desired message which is recorded thereon. The tape normally is a short section preferably of approximately 12 inches, which is long enough for messages of the desired length. It is important that after the short message is broadcast to the persons passing through the doorway, the message unit be de-energized and stopped. The microswitch 43 mounted on the plate 24 of FIG. 2, accomplishes this purpose. This switch is connected by appropriate wiring 53 to the electric relay 74 and the associated electrical components. An arm 52 with a tape engaging enlargement 54 at the outer end thereof will move into the pre-formed recess or notch 30' in the tape just after the message is completed and in turn actuate microswitch 43 to shut off the message unit. After the message unit is shut off all power to same is disconnected internally of the unit which is very important where such units are installed in establishments having infrequent customers. Power will not be wasted or used during the long periods between the entrance of potential customers. Also, this unit may be used in a person's household, and could be used to announce the entrance of such visitors when the door to the household is left unlocked. In other words, the unit could have a message of announcement recorded thereon, and be used much in the manner of a door bell to announce the arrival of a visitor.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination, an improved actuation mechanism for actuating a message device capable of reproducing a recorded message on opening of a door, the message device having a housing with an aperture extending through one wall thereof, the improvement comprising:
a switch mounted on the message device;
circuit means for electrically connecting the switch to the message device, actuation of the switch actuating the message device;
an actuating arm member connected to the switch and extending therefrom, an inner end portion of the arm member being stationarily mounted to the switch, a distal end portion of the arm member being mounted to the outer end of said inner end portion for movement relative thereto;
a disc having a flange disposed perimetrically thereabout, a portion of the disc being rotatably received within the aperture in the wall of the housing, the flange being of a diameter greater than the aperture, surface portions of the flange abutting surface portions of the wall adjacent the aperature, the switch being mounted to the disc on a surface portion thereof extending externally of the housing through said aperture, the switch extending externally of the housing;
means for retaining the disc in the aperture for rotation therewithin, whereby the position of the switch can be adjusted relative to the housing on rotation of the disc; and,
means for adjusting the position of said distal end portion relative to said inner end portion of the arm member, the distal end portion of the arm member being positioned to contact a portion of the door as the door is opened, thereby to actuate the switch and thus the message device.

2. In the combination of claim 1, wherein the distal end portion of the arm member is a flexible rod.

3. In the combination of claim 1, wherein the retaining means comprising spring-biased clips mounted to the housing and biasing against surface portions of the flange.

4. In the combination of claim 1, wherein the message device is a magnetic tape player unit, the improvement further comprising a switch mounted on the message device, the switch having a feeler arm mounted thereto for contact with a notch formed in the magnetic tape, contact between the feeler arm and notch stopping the operation of the message device after a message has been reproduced.

5. In the combination of claim 4, wherein the circuit means comprise an electric relay actuable by the first and second-mentioned switches.

6. In the combination of claim 1, wherein the longitudinal axis of the distal end portion of the arm member is mounted for longitudinal movement relative to the longitudinal axis of the inner end portion of said arm member.

7. In the combination of claim 1, wherein the adjusting means comprise:
a sleeve member having a threaded aperture formed therein, the outer end of the inner end portion and the inner end of the distal end portion of the arm member being received within the sleeve member from opposite ends thereof respectively;
a threaded screw matingly received within the threaded aperture, the portion of the screw being adjustable within said aperture to be contactable with said arm member to allow adjustment of the position of the distal end portion of the arm member relative to the inner end portion thereof.

8. In the combination of claim 1, wherein the improvement further comprises bracket means mounted to the wall and attachment means on the message device for mounting to the bracket means, the message device being thereby rapidly mountable to and dismountable from the wall.

* * * * *